(12) United States Patent
Fernandes

(10) Patent No.: US 8,476,216 B2
(45) Date of Patent: Jul. 2, 2013

(54) COLORED SPECKLES HAVING DELAYED RELEASE PROPERTIES

(75) Inventor: Gregory E. Fernandes, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 144 days.

(21) Appl. No.: 13/040,393

(22) Filed: Mar. 4, 2011

(65) Prior Publication Data

US 2011/0294713 A1  Dec. 1, 2011

Related U.S. Application Data

(60) Provisional application No. 61/349,393, filed on May 28, 2010.

(51) Int. Cl.
| | |
|---|---|
| C11D 3/40 | (2006.01) |
| C11D 17/06 | (2006.01) |
| C11D 7/02 | (2006.01) |
| C11D 7/12 | (2006.01) |
| C11D 7/14 | (2006.01) |
| C11D 7/16 | (2006.01) |
| C11D 3/04 | (2006.01) |
| C11D 3/06 | (2006.01) |
| C11D 3/08 | (2006.01) |
| C11D 3/10 | (2006.01) |
| C11D 3/12 | (2006.01) |

(52) U.S. Cl.
USPC ........... 510/349; 510/438; 510/441; 510/276; 510/507; 510/508; 510/509; 510/510; 510/511; 510/512; 510/513

(58) Field of Classification Search
USPC ................. 510/438, 220, 276, 349, 509, 513, 510/441, 507, 508, 510, 511, 512
See application file for complete search history.

(56) References Cited

U.S. PATENT DOCUMENTS

| | | | |
|---|---|---|---|
| 3,529,923 A | 9/1970 | Perry et al. | 8/77 |
| 3,661,785 A | 5/1972 | De Pierri | 252/8.55 |
| 3,989,635 A | 11/1976 | Toyoda et al. | 252/135 |
| 3,997,692 A | 12/1976 | Lamberti | 427/215 |
| 4,097,418 A | 6/1978 | Rolfes | 252/531 |
| 4,325,933 A | 4/1982 | Matsumoto et al. | 423/415 |
| 4,421,657 A * | 12/1983 | Allen et al. | 510/306 |
| 4,488,972 A | 12/1984 | Weinstein | 252/8.6 |
| 5,462,804 A | 10/1995 | Kokubu et al. | 428/402.24 |
| 5,605,883 A | 2/1997 | Iliff et al. | 510/444 |
| 6,440,926 B1 | 8/2002 | Spadoni et al. | 510/445 |
| 6,444,634 B1 * | 9/2002 | Mason et al. | 510/376 |
| 6,541,437 B2 | 4/2003 | Mata et al. | 510/348 |
| 2002/0147123 A1 | 10/2002 | Becker et al. | 510/305 |
| 2006/0019860 A1 * | 1/2006 | Cardozo et al. | 510/445 |
| 2010/0069282 A1 | 3/2010 | Prabhat et al. | 510/276 |
| 2011/0053823 A1 * | 3/2011 | Fernandes et al. | 510/349 |
| 2011/0294716 A1 | 12/2011 | Spanhove et al. | 510/438 |

FOREIGN PATENT DOCUMENTS

| | | |
|---|---|---|
| DE | 195 38 029 | 4/1997 |
| WO | WO 01/30952 A1 | 5/2001 |
| WO | WO 2006/099964 A1 | 9/2006 |
| WO | WO 2007/006357 A1 | 1/2007 |
| WO | WO 2011/020991 A1 | 2/2011 |

OTHER PUBLICATIONS

Patent Cooperation Treaty PCT International Search Report. Date of Mailing, Aug. 9, 2011. International Application No. PCT/US2011/037644. International Filing Date, May 24, 2011.

* cited by examiner

*Primary Examiner* — Lorna M Douyon
(74) *Attorney, Agent, or Firm* — Brenda D. Wentz

(57) ABSTRACT

This invention relates to non-bleeding and controlled color-releasing speckles for use in granular laundry detergents and other consumer products. The speckles are comprised of a salt or salt-containing carrier, a coloring agent, and a water-insoluble (or minimally water-soluble) salt coating.

20 Claims, No Drawings

COLORED SPECKLES HAVING DELAYED RELEASE PROPERTIES

CROSS REFERENCE TO RELATED APPLICATIONS

This application claims priority to U.S. Provisional Patent Application No. 61/349,393, entitled "Colored Speckles Having Delayed Release Properties" which was filed on May 28, 2010.

FIELD OF THE INVENTION

This invention relates to non-bleeding and controlled color-releasing speckles for use in granular laundry detergents and other consumer products. The speckles are comprised of a salt or salt-containing carrier, a coloring agent, and a water-insoluble (or minimally water-soluble) salt coating.

BACKGROUND OF THE INVENTION

Recently there has been an increasing trend towards the incorporation of colored speckles into particulate laundry detergent compositions and other consumer products. Dyes and pigments have been widely used to produce colored speckles that serve aesthetic purposes only. Novel effects such as release of color into the wash water and hueing of fabrics, however, tend to require higher colorant loadings. There is, particularly at these higher colorant loadings, a fabric staining risk associated with dye and pigment use. Thus, the need exists for colored speckles for use in detergent compositions and other consumer products that can serve both an aesthetic purpose and also provide the novel effects of release of color and hueing of fabrics without staining the substrates that come into contact with the colored speckles.

Additionally, the inclusion of colored speckles in granulated laundry detergents presents the problem of bleeding or transferring onto the powdered detergent surrounding the speckle. This results in the base powder becoming colored, which is a highly undesirable effect. Thus, the need exists for colored speckles for use in detergent compositions which do not bleed or transfer to the surrounding base powder.

Attempts by others to include colored speckles in detergents include, for example, U.S. Pat. No. 4,097,418 to Rolfes. This patent discloses the use of colored speckles in granular detergent compositions. The colored speckles are comprised of a water soluble inorganic alkaline salt which acts as a carrier for the coloring agent. The coloring agent may be a water-soluble dye or a water-insoluble pigment. U.S. Pat. No. 6,541,437 to Mata et al. discloses the use of glassy phosphate particles as carriers for dyes and/or pigments. The colored particles may be added to a detergent formulation to aid in improving its cleaning performance.

Yet another example includes WO 2006/099964 A1 to Andrade et al. which discloses the use of a speckle granule comprised of a clay mineral carrier and a mica pigment. To increase the rate of dispersion of the granule in the wash liquor, this reference teaches the inclusion of a soluble builder salt, such as sodium tripolyphosphate, admixed with the clay in the granule. A water-soluble polymeric coating, such as polyvinyl alcohol, may also be added to the granule, to help prevent the mica from leaving the clay during storage and handling.

The problems associated with previous attempts by others to include colored speckles in detergents include fabric staining from the colorant used in the speckles and bleeding and transferring of the colorant to the surrounding detergent powder. There also exists a need for time controlled color release (e.g. release on demand or delayed release that may be optimized for long delay or short delay) into wash water from the speckles. The present disclosure addresses and overcomes these problems.

The colored speckles of the present disclosure are ideally suited for providing color to various other compositions including, but not limited to granular detergent compositions (such as laundry detergent compositions). The colored speckles may provide non-staining, aesthetically-pleasing features to textile substrates treated therewith. They also resist bleeding or transferring to the surrounding detergent composition. Furthermore, the colored speckles of the present disclosure provide controlled release of color, or other actives, from the salt or salt-containing carrier and provide desirable color to the wash water. For these reasons, and others that will be described herein, the present colored speckles represent a useful advance over the prior art.

BRIEF SUMMARY OF THE INVENTION

Provided herein is a colored speckle comprising a majority by weight of at least one salt or salt-containing carrier material, at least one coloring agent, and at least one water-insoluble salt, wherein the at least one carrier material and the at least one coloring agent form a carrier-coloring agent composite, and wherein the at least one water-insoluble salt is a product of a reaction between the carrier material and a water-soluble salt.

Yet another alternative includes a colored speckle comprising a majority by weight of at least one salt or salt-containing carrier material, at least one polymeric coloring agent, and at least one water-insoluble salt, wherein the at least one carrier material and the at least one polymeric coloring agent form a carrier-coloring agent composite, and wherein the at least one water-insoluble salt is a product of a reaction between the carrier material and a water-soluble salt.

Further provided herein is a colored speckle comprising a majority by weight of at least one soda ash-containing carrier material, at least one polymeric coloring agent, at least one water-insoluble salt, wherein the at least one soda ash-containing carrier material and the at least one polymeric coloring agent form a soda ash-coloring agent composite, and wherein the at least one water-insoluble salt is a product of a reaction between the soda ash-containing carrier is material and a water-soluble salt.

Also provided herein is a colored speckle comprising a majority by weight of sodium carbonate carrier material, at least one polymeric coloring agent, at least one water-insoluble salt, wherein the sodium carbonate carrier material and the polymeric coloring agent form a sodium carbonate-coloring agent composite, and wherein the at least one water-insoluble salt is a product of a reaction between the sodium carbonate carrier material and a water-soluble salt.

Further provided herein is a colored speckle comprising at least one salt or salt-containing carrier material, a first layer comprising at least one coloring agent, wherein the coloring agent is in direct contact with at least a portion of the at least one salt or salt-containing carrier material, and a second layer comprising a water-insoluble salt, wherein the water-insoluble salt is in direct contact with at least a portion of the coloring agent layer.

Yet another alternative includes a colored speckle comprising at least one salt or salt-containing carrier material, a first layer comprising at least one coloring agent, wherein the coloring agent is in direct contact with at least a portion of the at least one salt or salt-containing carrier material, a second layer comprising a water-insoluble salt, wherein the water-insoluble salt is in direct contact with at least a portion of the coloring agent layer, wherein the at least one carrier material and the at least one coloring agent form a carrier-coloring agent composite, and wherein the at least one water-insoluble salt is a product of a reaction between the carrier-coloring agent composite material and a water-soluble salt.

Further provided herein is a method for forming a colored speckle comprising the steps of providing at least one salt or salt-containing carrier material, applying at least one coloring agent to the at least one salt or salt-containing carrier material to form a carrier-coloring agent composite, applying at least one water-soluble salt to the carrier-coloring agent composite, and allowing the at least one water-soluble salt to react with the carrier-coloring agent composite to form a water-insoluble salt on the surface of the colored speckle.

DETAILED DESCRIPTION OF THE INVENTION

All U.S. and foreign patents and U.S. patent applications disclosed in this specification are hereby incorporated by reference in their entirety.

The present disclosure relates to non-bleeding and controlled color releasing colored speckles for use in granular detergent compositions. The time delay for release of color from the speckles may be optimized or adjusted for a short time delay or a long time delay from the time the colored speckles are activated with an aqueous medium (e.g. water) and when the color is visually observable in the aqueous medium. The speckles/color-release concepts described herein may also find applications in other consumer products outside powdered laundry detergents.

The colored speckles are comprised of salt or salt-containing granules which act as a carrier for a coloring agent and a water-insoluble, or minimally water-soluble, salt material. The combined use of a water-insoluble or minimally water-soluble salt coating with the carrier allows for delayed release (i.e. takes longer than 1 to 5 seconds) of the coloring agent from the carrier and into the wash water. It also provides good resistance to color bleeding into the surrounding detergent composition. Herein, the present disclosure describes a colored speckle and a method for making the colored speckle which provides controlled release of the coloring agent in wash water while still preventing color migration or bleed on powdered detergent.

The term "non-staining" as used herein, generally refers to a coloring agent, or a composition that contains such a coloring agent, that may be washed or removed from substrate surfaces (e.g. skin, fabric, wood, concrete) with relatively little effort and without staining the substrate to an appreciable extent.

The term "non-bleeding," as used herein, generally refers to a coloring agent-containing composition that does not substantially color the material surrounding the composition under conditions wherein the material is not intended to be colored. For example, the colored speckles of the present invention will generally be considered to be "non-bleeding" if the colored speckles fail to substantially color the surrounding powdered detergent in its unused state (i.e. while it remains in the package).

The term "water-insoluble" or "minimally water soluble," as used herein, generally refers to a material whose solubility in water at 20° C. and 1 atmosphere of pressure is less than 3 grams/100 ml of water.

The term "water-soluble," as used herein, generally refers to a material whose solubility in water at 20° C. and 1 atmosphere of pressure is greater than 3 grams/100 ml of water.

The term "salt" as used herein, generally refers to ionic compounds comprised of both cations (positively charged ions) and anions (negatively charged ions) so that the product is electrically neutral (without a net charge). These component ions may be inorganic or organic ions, monatomic or polyatomic, monovalent or multivalent.

The term "salt containing" as used herein, generally refers to a physical blend or mixture of a salt and some other component/components (organic or inorganic) that is either in the powdered form (may be referred to herein as the carrier material) or in a granulated form (may be referred to herein as granules or carrier granules). These "other" components may be salts (water-soluble salts as well as water-insoluble or minimally water-soluble salts) and other organic or inorganic materials (for example: minerals, chalk, mica, clays, etc).

The term "carrier-coloring agent composite" as used herein refers to a material or "carrier" (salt or other, single component or multi-component, powder or granule) that has at least some part of its surface in contact with a color or coloring agent. The color or coloring agent may be adsorbed to the surface of the carrier.

To delay release of the coloring agent from the carrier granule, a water-insoluble or minimally water-soluble salt may be applied to the carrier-coloring agent composite. The salt may be applied to the composite as a uniform coating or as a non-uniform coating. The water-insoluble or minimally water-soluble salt coating acts to delay the release of the coloring agent from the carrier. The thickness of the coating (or the amount of water-insoluble or minimally water-soluble salt) may affect the speed with which the coloring agent is released from the granule. A thicker coating layer (or greater the amount of water-insoluble or minimally water-soluble salt) may prolong the time it takes for the coloring agent to release from the granule. In comparison, a thinner coating may allow the coloring agent to release more quickly. Thus, the release of coloring agent from the carrier may be controlled by various factors, such as the thickness of the water-insoluble or minimally water-soluble salt coating applied to the carrier-coloring agent composite.

A water-soluble salt (also referred to herein as the "release-rate modifier") is generally used to effectuate the delayed release of the coloring agent from the carrier-coloring agent composite material. This activity occurs through a reaction between the water-soluble salt (release-rate modifier) and the (water-soluble) salt present in the carrier agent material or granule to form a water-insoluble salt coating thereon. Thus, the colored speckle of the present invention having delayed color release properties is made.

There may be multiple water-soluble salts present in the carrier granule that could react with the release-rate modifier to give the same insoluble precipitate (for example if aqueous magnesium sulfate is applied to granules containing a mixture of soda ash and potassium carbonate; both will react with the magnesium sulfate to give the same precipitate of magnesium carbonate) or multiple insoluble precipitates (for example if aqueous magnesium sulfate is applied to granules containing a mixture of soda ash and sodium phosphate; each will react with the magnesium sulfate to give distinct precipitates of magnesium carbonate and magnesium phosphate respectively) or there may be at least one such water-soluble carrier salt present (to react with the release-rate modifier). Similarly, a carrier material or granule/speckle may be treated with a solution of multiple release-rate modifiers/at least one release rate modifier.

The mechanism by which two water-soluble salts combine to form a water-insoluble precipitate (salt) is an example of a displacement/replacement reaction. When two water-soluble salts, AB and CD, are dissolved in water, they tend to dissociate and yield a solution of $A^+$, $B^-$, $C^+$, and $D^-$ ions (monovalent ions are used herein for exemplary purposes and should not be considered limiting). Now, by further chemical reaction, these ions may combine to give AD and CB. Additionally, it is possible that one of the salts (AD or CB) may be insoluble (or minimally soluble) in water. Thus, it will precipitate out of solution.

As one non-limiting example of a displacement/replacement reaction, the combination of sodium carbonate and magnesium sulfate (in the presence of water) results in the formation of a white precipitate of magnesium carbonate (due to its minimal solubility in water at room temperature). In the same way, when an aqueous solution of magnesium sulfate is added to soda ash granules (colored or un-colored), an insoluble/minimally soluble precipitate of magnesium carbonate is generated which deposits on/coats the surface of the soda ash granules and delays dissolution of the granules themselves and/or consequently delays the release of whatever active (such as a coloring agent) may be present on or within/throughout the soda ash material.

When added to an aqueous solution, these treated colored speckles (such that an insoluble salt coating is present on their surface) typically dissolve or disintegrate at a slower rate than speckles that have no insoluble salt deposited on their surface. Accordingly, the release of coloring agent (or other active) contained therein occurs at a slower rate than speckles that have no insoluble salt deposited on their surface. The water-insoluble salt coating generally remains intact (for the period of observation of 10 to 15 minutes) and is left behind as a by-product of the colored speckle.

The water-soluble salt to be used as a release-rate modifier may be any material that is capable of reacting with at least one salt in the carrier material to form or precipitate a water-insoluble or minimally water-soluble salt or salts. The choice of water-soluble salt to be used as release-rate modifier may be dependent on the type of salt or salts present in the carrier granule used to make the colored speckles. A carrier material or granule/speckle may be treated with a single release-rate modifier or multiple release-rate modifiers (in other words, at least one release-rate modifier).

In one non-limiting embodiment, this structural arrangement of carrier to coloring agent to water-insoluble salt may be achieved by adding a coloring agent to the salt or salt-containing carrier prior to or after granulation such that the resulting colored granule has color uniformly distributed throughout its body or only on its surface or non-uniformly distributed throughout its body. For example, in some cases the coloring agent may be added to a soda ash material prior to a granulation process. In this instance, the coloring agent may be distributed uniformly throughout the body of the granule. In other cases, the coloring agent may be applied to the soda ash granules after a granulation process, such as via a spray application. In this instance, the coloring agent may be present only on the outer surface of the granule. When present on the outer surface of the granule, the coloring agent may be found on the outer 1% of the granule, on the outer 1-2% of the granule, on the outer 1-5% of the granule, on the outer 1-10% of the granule, on the outer 1-20% of the granule, on the outer 1-30% of the granule, on the outer 1-40% of the granule, on the outer 1-50% of the granule, on the outer 1-60% of the granule, on the outer 1-70% of the granule, on the outer 1-80% of the granule, or on the outer 1-90% of the granule, of the volume of the speckle granule prior to application of the water-insoluble or minimally water-soluble salt.

In one non-limiting embodiment, this structural arrangement of carrier to coloring agent to water-insoluble salt may be achieved by adding a coloring agent to the inner walls or surfaces of the salt or salt-containing granule before application of the water-insoluble or minimally water-soluble salt.

Carrier

The carrier is preferably in the form of a salt or salt-containing granule. The colored speckle may be comprised of a majority by weight of the carrier. The material used to produce the salt or salt-containing granule may be characterized as being comprised of at least one water-soluble salt or a mix of at least one water-soluble salt and at least one water-insoluble material.

The salt or salt-containing carrier may be selected from at least one of, but is not limited to, the following materials: lithium salts, sodium salts (such as but not limited to sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium thiosulfate, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium malate, sodium stearate, sodium lauryl sulfate, sodium benzoate, sodium bromate, sodium formate, sodium pyrophosphate, sodium selenate, sodium periodate, sodium molybdate, sodium hydrates, and mixtures thereof), potassium salts (such as but not limited to potassium sulfate, potassium chloride, potassium acetate, potassium chlorate, potassium chromate, potassium iodide, potassium nitrate, potassium nitrite, potassium thiosulfate, potassium selenate, potassium formate, potassium bromide, potassium carbonate, potassium bicarbonate, potassium persulfate, potassium phosphate, potassium permanganate, potassium iodate, potassium fluoride, potassium bisulfate, potassium thiocyanate, potassium dihydrogen phosphate, potassium dichromate, potassium cyanide, potassium bromate, potassium benzoate, potassium arsenate, potassium azide, potassium oxalate, potassium silicate, potassium sulfite, potassium citrate, potassium hydrates, and mixtures thereof), rubidium salts, cesium salts, francium salts, beryllium salts, magnesium salts (such as but not limited to magnesium sulfate, magnesium chloride, magnesium acetate, magnesium chlorate, magnesium chloride, magnesium chromate, magnesium iodide, magnesium nitrate, magnesium thiosulfate, magnesium selenate, magnesium perchlorate, magnesium formate, magnesium bromide, magnesium sulfite, magnesium citrate, magnesium fluorosilicate, magnesium hydrates, and mixtures thereof), calcium salts (such as but not limited to calcium chloride, calcium acetate, calcium chlorate, calcium chromate, calcium iodide, calcium nitrate, calcium formate, calcium bromide, calcium bicarbonate, calcium permanganate, calcium bromate, calcium perchlorate, calcium hydrates, and mixtures thereof), strontium salts, barium salts, radium salts, scandium salts, titanium salts, zirconium salts, hafnium salts, vanadium salts, chromium salts, molybdenum salts, tungsten salts, manganese salts, iron salts (II & III), ruthenium salts, cobalt salts, iridium salts, nickel salts, palladium salts, platinum salts, copper (I & II) salts, silver salts, gold salts, zinc salts, cadmium salts, boron salts, aluminum salts, thallium salts, antimony salts, bismuth salts, ammonium salts, quaternary ammonium salts, pyridinium salts, nitrate salts (such as but not limited to sodium nitrate, ammonium nitrate, magnesium nitrate, aluminum nitrate, barium nitrate, cadmium nitrate, calcium nitrate, chromium nitrate, cobalt nitrate, cupric nitrate, iron nitrate, lead nitrate, potassium nitrate, nickel nitrate, silver nitrate, strontium nitrate, zinc nitrate, nitrate hydrates, and mixtures thereof), nitrite salts, chloride salts (such as but not limited to sodium chloride, ammonium chloride, magnesium chloride, aluminum chloride, antimony chloride, barium chloride, cadmium chloride, calcium chloride, chromium chloride, cobalt chloride, cupric chloride, ferric chloride, ferrous chloride, mercury chloride, nickel chloride, potassium chloride, strontium chloride, zinc chloride, chloride hydrates, and mixtures thereof), chlorate salts (such as but not limited to sodium chlorate, ammonium chlorate, magnesium chlorate, aluminum chlorate, barium chlorate, cadmium chlorate, calcium chlorate, cobalt chlorate, cupric chlorate, lead chlorate, potassium chlorate, silver chlorate, strontium chlorate, zinc chlorate, chlorate hydrates, and mixtures thereof), chromate salts (such as but not limited to sodium chromate, ammonium chromate, magnesium chromate, calcium chromate, copper chromate, iron chromate, potassium chromate, chromate hydrates, and mixtures thereof), cyanate salts, cyanide salts, fluoride salts, acetate salts (such as but not limited to sodium acetate, ammonium acetate, magnesium acetate, aluminum acetate, barium acetate, cadmium acetate, calcium acetate, chromium acetate, cobalt acetate, cupric acetate, lead acetate, nickel acetate, potassium acetate, strontium acetate, zinc acetate, acetate hydrates, and mixtures thereof), bromide salts (such as but not limited to sodium bromide, ammonium bromide, magnesium bromide, aluminum bromide, barium bromide, cadmium bromide, calcium bromide, chromium bromide, cobalt bromide, cupric bromide, ferric bromide, ferrous bromide, lead bromide, nickel bromide, potassium bromide, strontium bromide, zinc bromide, bromide hydrates, and mixtures thereof), boride salts, iodide salts (such as but not limited to sodium iodide, aluminum iodide, ammonium iodide, arsenic iodide, magnesium iodide, barium iodide, cadmium iodide, calcium iodide, cobalt iodide, iron iodide, nickel iodide, potassium iodide, strontium iodide, zinc iodide, iodide hydrates, and mixtures thereof), sulfate salts (such as but not limited to magnesium sulfate, sodium sulfate, cadmium sulfate, aluminum sulfate, ammonium sulfate, chromium sulfate, cobalt sulfate, cupric sulfate, iron sulfate, nickel sulfate, potassium sulfate, zinc sulfate, sulfate hydrates, and mixtures thereof), sulfite salts (such as but not limited to ammonium sulfite, potassium sulfite, sodium sulfite, magnesium sulfite, sulfite hydrates, and mixtures thereof), sulfide salts (such as but not limited to ammonium sulfide, potassium sulfide, sodium sulfide, sulfide hydrates, and mixtures thereof), sulfamate salts, sulfonate salts, carbonate salts (such as but not limited to sodium carbonate, sodium percarbonate, potassium carbonate, ammonium carbonate, carbonate hydrates, and mixtures thereof), bicarbonate salts, ascorbate salts, phosphate salts (such as but not limited to ammonium phosphate, potassium phosphate, sodium phosphate, sodium tripolyphosphate, phosphate hydrates, and mixtures thereof), polyphosphate salts (such as but not limited to sodium tripolyphosphate), citrate salts (such as but not limited to potassium citrate, sodium citrate, magnesium citrate, citrate hydrates, and mixtures thereof), oxides (such as metal oxides, zinc oxide, leaded zinc oxide, antimony oxide, and mixtures thereof), hydroxides, cyanide salts, permanganates, adipates, benzoates, fluorides, silicates (such as but not limited to sodium silicate, potassium silicate, barium silicates, silicate hydrates, and mixtures thereof), lactates, malates, perchlorates, persulfates, oxalates (such as but not limited to sodium oxalate, chromium oxalate, iron oxalate, potassium oxalate, oxalate hydrates, and mixtures thereof), organic salts, alkali metal aluminosilicates, borax, clay, silica, zeolite, diatomaceous earth, mica, talc, chalk, gypsum, lithopone, titanium dioxide, barytes, silica flatting agents, and the like, and combinations thereof.

It may be preferable that the carrier exhibits a particular range of particle size, as determined, for example, by sieving techniques according to ASTM D1921-06 ("Standard Test Method For Particle Size (Sieve Analysis) of Plastic Materials"). Alternative methods known to those skilled in the art may also be utilized for determining particle size. For example, other sieving techniques may be used or electronic laboratory equipment known for determining particle size may alternatively be employed. For the carriers of the present invention, it may be preferably that the carriers exhibit an average particle size of about 0.1 mm to about 2 mm, more preferably an average particle size of about 0.3 mm to about 1.5 mm.

Soda ash (e.g. sodium carbonate) may be a preferred carrier for the colored speckles of the present invention. Soda ash is known for use in powdered laundry detergent formulations. However, one of the drawbacks of using soda ash as a carrier for coloring agents in detergent formulations is the fact that coloring agents adsorbed on the surface of soda ash granules tend to migrate or bleed onto the surrounding powdered detergent. Such bleeding or migration of the color into the surrounding material detrimentally affects its suitability for use in powdered laundry detergent formulations. Also, coloring agents adsorbed on soda ash also release into wash water instantly (i.e. in less than 1 minute, in the absence of any coating to prevent such instant color release. Thus, the present invention provides a solution to the problem of creating colored speckles that exhibit delayed release of color, or other actives, from a salt or salt-containing carrier without bleeding into the surrounding material. While soda ash may be a preferred carrier for the colored speckles of the present invention, any water soluble salt may be used (to form the speckles or granules) that, when treated with a second water soluble salt (or aqueous solution thereof), results in a third salt that is water insoluble or minimally water soluble.

Coloring Agent

The coloring agent of the present invention is preferably a polymeric colorant. The term "polymeric colorant" generally refers to a colorant having at least one chromophore portion attached to at least one oligomeric or polymeric chain, wherein the chain has at least three repeating units. The oligomeric or polymeric constituent can be bound to the chromophore via any suitable means, such as a covalent bond, an ionic bond, or suitable electrostatic interaction. Generally, the polymeric colorant may be characterized by having an absorbance in the range of between about 300 nanometers and about 900 nanometers, as measured by UV-vis spectroscopy.

As a function of its manufacturing process, the polymeric colorant has a molecular weight that is typically represented as a molecular weight distribution. Accordingly, the molecular weight of the polymeric colorant is generally reported as an average molecular weight, as determined by its molecular weight distribution.

The chromophore group of the colorant may vary widely, and may include compounds characterized in the art as dyestuffs or as pigments. The actual group used will depend to a large extent upon, for instance, the desired color and color-fastness characteristics. The chromophore group may be attached to at least one polyalkyleneoxy-substituent through a suitable linking moiety of nitrogen, oxygen, sulfur, etc.

Examples of chromophore groups include nitroso, nitro, azo (including monoazo, disazo, trisazo, tetrakisazo, polyazo, formazan, azomethine and metal complexes thereof), stilbene, bis-stilbene, biphenyl, oligophenethylene, fluorene, coumarin, napthalamide, diarylmethane, triarylmethane, xanthene acridine, quinoline, methine (including polymethine), thiazole, indamine, indophenol, azine, thiazine, oxazine, aminoketone, hydroxyketone, anthraquinone (including anthrapyrazolines, anthrone, anthrapyridone, anthrapyrimidine, flavanthrone, pyranthrone, benzanthrone, perylene, perinone, naphthalimide and other structures formally related to anthraquinone), indigoid (including thioindigoid), phthalocyanine chromophore groups, and mixtures thereof.

Examples of suitable polymeric chains are polyalkyleneoxy chains. The term "polyalkyleneoxy," as used herein, generally refers to molecular structures containing the following repeating units: —CH$_2$CH$_2$O—, CH$_2$CH$_2$CH$_2$O—, —CH$_2$CH$_2$CH$_2$CH$_2$O—, —CH$_2$CH(CH$_3$)O—, —CH$_2$CH (CH$_2$CH$_3$)O—CH$_2$CH$_2$CH(CH$_3$)O—, and any combinations thereof.

Typical of such groups which may be attached to the chromophore group are the polymeric epoxides, such as the polyalkylene oxides and copolymers thereof. Typical polyalkylene oxides and copolymers of same which may be employed to provide the colorants include those made from alkylene oxide monomers containing from two to twenty carbon atoms, or more preferably, from two to six carbon atoms. Examples include: polyethylene oxides; polypropylene oxides; polybutylene oxides; oxetanes; tetrahydrafurans; copolymers of polyethylene oxides, polypropylene oxides and polybutylene oxides; and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

It is to be understood that because the colorants may not ordinarily be chemically bound to the carrier, the precise chemical identity of the end group on the polyalkyleneoxy group may not be critical insofar as the proper functioning of the colorant is concerned in the composition. With this consideration in mind, certain most preferred colorants will be defined wherein certain end groups will be identified. Such recitation of end groups is not to be construed as limiting the invention in its broader embodiments in any way. According to such a most preferred embodiment the colorants may be characterized as follows:

R{A[(alkyleneoxy constituent)$_n$R$_1$]$_m$}$_x$ wherein R is an organic chromophore group, A is a linking moiety in said organic chromophore group selected from the group consisting of N, O, S or CO$_2$, the alkylene moiety of the alkyleneoxy constituent contains from 2 to about 4 carbon atoms, n is an integer of from 2 to about 230, m is 1 when A is O, S, CO$_2$ and 1 or 2 when A is N, x is an integer of from 1 to 5, and the product of n times x times m (n.m.x) is from 2 to about 230, and R$_1$ is a member of the group consisting of

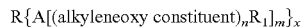

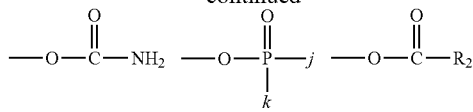

and sulfonates and sulfates of each of the members of said group, wherein R$_2$ is H, an alkyl radical containing up to about 20 carbon atoms or carboxy-terminated alkyl radical containing up to about 20 carbon atoms, j and k are OH, OM or OR$_3$ wherein M is a cation moiety of an alkali metal, an alkaline earth metal, transition metal, e.g., nickel, etc. or ammonium, and R$_3$ is an alkyl radical containing up to about 20 carbon atoms.

The oligomeric constituent can be any suitable constituent including, but not limited to, oligomeric constituents selected from the group consisting of (i) oligomers comprising at least three monomers, or repeating units, selected from the group consisting of C$_2$-C$_{20}$ alkyleneoxy groups, glycidol groups, and glycidyl groups, (ii) aromatic or aliphatic oligomeric esters conforming to structure (I)

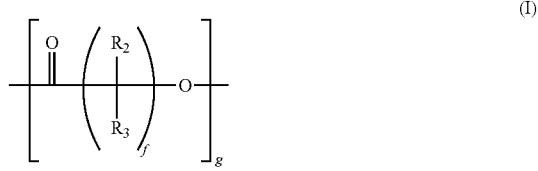

and (iii) combinations of (i) and (ii). In structure (I), R$_2$ and R$_3$ are independently selected from the group consisting of hydrogen and C$_1$-C$_{10}$ alkyl groups, f is an integer between and including 1 and 10, and g is any positive integer or fraction between and including 1 and 20. As will be understood by those of ordinary skill in the art, suitable values for g include both integers and fractions because the length of the oligomeric constituent on the individual polymeric colorant molecules may vary. Thus, the value for g represents an average length of the ester chain for a given sample or collection of polymeric colorant molecules. In certain embodiments, the polymeric colorant can comprise one or more oligomeric constituents consisting of three or more ethylene oxide monomer groups.

Exemplary polymeric colorants include Liquitint® polymeric colorants, Cleartint® polymeric liquid concentrate colorants, Reactint® polymeric colorants, and Palmer® polymeric colorants, all of which are available from Milliken Chemical, a division of Milliken & Company of Spartanburg, S.C. Liquitint® polymeric colorants are characterized in that they are water soluble, non-staining, colorants. They are widely used in laundry detergents, fabric softeners, and other consumer and industrial cleaning products. Liquitint® polymeric colorants are generally bright liquid colorants which exhibit excellent solubility in water, are compatible with other chemicals present in their end-use formulations, and are easy to handle. Liquitint® polymeric colorants may be used to provide color in both aqueous and solid systems. The unique polymeric nature of Liquitint® polymeric colorants provides reduced staining to skin, textiles, hard surfaces, equipment, and the like.

Cleartint® polymeric liquid concentrate colorants are specially designed liquid colorants often used for coloring clarified polypropylene articles. These colorants may be incorporated into polypropylene resins easily without detrimentally

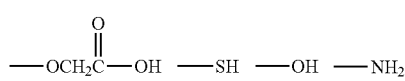

affecting the clarity of the article to provide transparent, clear and brightly colored polypropylene articles. Cleartint® liquid concentrate polymeric colorants are oligomeric coloring materials which combine the exceptional aesthetics of dyes with the migration resistance of pigments. These colorants may be used as light tints to mask residual haze, or they may be used for deep, rich shades that are not possible with pigment colorants. Cleartint® liquid concentrate polymeric colorants allow clarified polypropylene to rival the beauty of higher cost plastic materials. The technical and physical property benefits of clarified polypropylene may be exploited without sacrificing product aesthetics.

Reactint® polymeric colorants are liquid polymeric colorants useful for coloring polyurethane and other thermoset resins. These colorants are reactive polymeric colorants that consist of chromophores which are chemically bound to polyols. This arrangement allows the polymeric colorant to react into the polyurethane polymer matrix. Unlike pigment pastes, which are dispersions of solid particles in a liquid carrier, Reactint® polymeric colorants are 100% homogeneous liquids that are soluble in polyol and will not settle over time. Because of this pure liquid and easy to disperse nature, it is possible to blend Reactint® colorants in-line and on-the-fly, while producing polyurethane foams and resins.

Palmer® polymer colorants are liquid colorants specially developed for use in washable applications, such as in markers, paints and other art products. They contain no heavy metals, are non-toxic, and have excellent non-staining properties on skin, fabric and other surfaces. Palmer® polymeric colorants have very good compatibility with aqueous ink formulations and provide bright colors.

It is also contemplated to be within the scope of the present invention that other colorants may be utilized as the coloring agent. For example, a colorant selected from one or more of the following classes may be suitable for use as the coloring agent in the colored speckle: acid dyes, basic dyes, direct dyes, solvent dyes, vat dyes, mordant dyes, indigoid dyes, reactive dyes, disperse dyes, sulfur dyes, fluorescent dyes; pigments, both organic and inorganic; natural colorants; and the like.

Release-Rate Modifiers (Water-Soluble Salts)

A water-soluble salt (also referred to herein as the "release-rate modifier") is generally used to effectuate the delayed release of the coloring agent from the carrier-coloring agent composite material. Without being bound by theory, this activity occurs through a reaction between the water-soluble salt (release-rate modifier) and the (water-soluble) salt present in the carrier agent material or granule to form a water-insoluble salt coating thereon. Thus, the colored speckle of the present invention having delayed color release properties is made. There may be multiple water-soluble salts present in the carrier granule that could react with the release-rate modifier to give the same insoluble precipitate (for example if aqueous magnesium sulfate is applied to granules containing a mixture of soda ash and potassium carbonate; both will react with the magnesium sulfate to give the same precipitate of magnesium carbonate) or multiple insoluble precipitates (for example if aqueous magnesium sulfate is applied to granules containing a mixture of soda ash and sodium phosphate; each will react with the magnesium sulfate to give distinct precipitates of magnesium carbonate and magnesium phosphate respectively) or there may be at least one such water-soluble carrier salt present (to react with the release-rate modifier). Similarly, a carrier material or granule/speckle may be treated with a solution of multiple release-rate modifiers/at least one release rate modifier.

The mechanism by which two water-soluble salts combine to form a water-insoluble precipitate (salt) is an example of a displacement/replacement reaction. When two water-soluble salts, AB and CD, are dissolved in water, they tend to dissociate and yield a solution of $A^+$, $B^-$, $C^+$, and $D^-$ ions (monovalent ions are used herein for exemplary purposes and should not be considered limiting). Now, by further chemical reaction, these ions may combine to give AD and CB. Additionally, it is possible that one of the salts (AD or CB) may be insoluble (or minimally soluble) in water. Thus, it will precipitate out of solution.

As one non-limiting example of a displacement/replacement reaction, the combination of sodium carbonate and magnesium sulfate (in the presence of water) results in the formation of a white precipitate of magnesium carbonate (due to its minimal solubility in water at room temperature). In the same way, when an aqueous solution of magnesium sulfate is added to soda ash granules (colored or un-colored), an insoluble/minimally soluble precipitate of magnesium carbonate is generated which deposits on/coats the surface of the soda ash granules and delays dissolution of the granules themselves and/or consequently delays the release of whatever active (such as a coloring agent) may be present on or within/throughout the soda ash material.

When added to an aqueous solution, these treated colored speckles (such that an insoluble salt coating is present on their surface) typically dissolve or disintegrate at a slower rate than speckles that have no insoluble salt deposited on their surface. Accordingly, the release of coloring agent (or other active) contained therein occurs at a slower rate than speckles that have no insoluble salt deposited on their surface. The water-insoluble salt coating generally remains intact (for the period of observation of 10 to 15 minutes) and is left behind as a by-product of the colored speckle.

The water-soluble salt to be used as a release rate modifier may be any material that is capable of reacting with at least one salt in the carrier material to form or precipitate a water-insoluble or minimally water-soluble salt or salts. The choice of water-soluble salt to be used as release-rate modifier may be dependent on the type of salt or salts present in the carrier granule used to make the colored speckles. A carrier material or granule/speckle may be treated with a single release-rate modifier or multiple release-rate modifiers (in other words, at least one release rate modifier).

The at least one water-soluble salt may be selected from the group consisting of water-soluble salts of beryllium, magnesium, calcium, strontium, barium, lead, radium, scandium, titanium, zirconium, hafnium, vanadium, chromium, molybdenum, tungsten, manganese, iron(II & III), ruthenium, cobalt, iridium, nickel, palladium, platinum, mercury, copper (I & II), silver, gold, zinc, cadmium, boron, aluminum, thallium, antimony, bismuth, pyridinium, ammonium, quaternary ammonium, nitrate, nitrite, hydroxide, oxide, oxalate, phosphate, silicate, sulfide, carbonate, chromate, chlorate, sulfate, sulfite, acetate, citrate, iodide, bromide, chloride, hydrates thereof, and mixtures thereof.

Water-soluble salts of magnesium may be selected from the group consisting of magnesium sulfate, magnesium chloride, magnesium acetate, magnesium chlorate, magnesium chromate, magnesium iodide, magnesium nitrate, magnesium perchlorate, magnesium bromide, magnesium sulfite, magnesium citrate, magnesium hydrates, and mixtures thereof.

Water-soluble salts of sodium may be selected from the group consisting of sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium stearate, sodium benzoate, sodium bromate, sodium formate, sodium hydrates, and mixtures thereof.

Water-soluble salts of potassium may be selected from the group consisting of potassium sulfate, potassium chloride, potassium acetate, potassium chlorate, potassium chromate, potassium iodide, potassium nitrate, potassium nitrite, potassium formate, potassium bromide, potassium carbonate, potassium bicarbonate, potassium persulfate, potassium phosphate, potassium iodate, potassium fluoride, potassium bisulfate, potassium dihydrogen phosphate, potassium dichromate, potassium bromate, potassium benzoate, potassium oxalate, potassium silicate, potassium sulfite, potassium citrate, potassium hydrates, and mixtures thereof.

Water-soluble salts of calcium may be selected from the group consisting of calcium chloride, calcium acetate, calcium chlorate, calcium chromate, calcium iodide, calcium nitrate, calcium formate, calcium bromide, calcium bicarbonate, calcium permanganate, calcium bromate, calcium perchlorate, calcium hydrates, and mixtures thereof.

Water-soluble chloride salts may be selected from the group consisting of sodium chloride, ammonium chloride, magnesium chloride, aluminum chloride, antimony chloride, barium chloride, cadmium chloride, calcium chloride, chromium chloride, cobalt chloride, cupric chloride, ferric chloride, ferrous chloride, mercury chloride, nickel chloride, potassium chloride, strontium chloride, zinc chloride, chloride hydrates, and mixtures thereof.

Water-soluble sulfate salts may be selected from the group consisting of magnesium sulfate, sodium sulfate, cadmium sulfate, aluminum sulfate, ammonium sulfate, chromium sulfate, cobalt sulfate, cupric sulfate, iron sulfate, nickel sulfate, potassium sulfate, zinc sulfate, sulfate hydrates, and mixtures thereof.

Water-soluble sulfide salts may be selected from the group consisting of ammonium sulfide, potassium sulfide, sodium sulfide, sulfide hydrates, and mixtures thereof.

Water-soluble carbonate salts may be selected from the group consisting of sodium carbonate, sodium percarbonate, potassium carbonate, ammonium carbonate, carbonate hydrates, and mixtures thereof.

Water-soluble phosphate salts may be selected from the group consisting of ammonium phosphate, potassium phosphate, sodium phosphate, sodium tripolyphosphate, phosphate hydrates, and mixtures thereof.

Water-soluble silicates may be selected from the group consisting of sodium silicate, potassium silicate, barium silicates, silicate hydrates, and mixtures thereof.

Water-soluble acetate salts may be selected from the group consisting of sodium acetate, ammonium acetate, magnesium acetate, aluminum acetate, barium acetate, cadmium acetate, calcium acetate, chromium acetate, cobalt acetate, cupric acetate, lead acetate, nickel acetate, potassium acetate, strontium acetate, zinc acetate, acetate hydrates, and mixtures thereof.

Water-soluble bromide salts may be selected from the group consisting of sodium bromide, ammonium bromide, magnesium bromide, aluminum bromide, barium bromide, cadmium bromide, calcium bromide, chromium bromide, cobalt bromide, cupric bromide, ferric bromide, ferrous bromide, lead bromide, nickel bromide, potassium bromide, strontium bromide, zinc bromide, bromide hydrates, and mixtures thereof.

Water-soluble chlorate salts may be selected from the group consisting of sodium chlorate, ammonium chlorate, magnesium chlorate, aluminum chlorate, barium chlorate, cadmium chlorate, calcium chlorate, cobalt chlorate, cupric chlorate, lead chlorate, potassium chlorate, silver chlorate, strontium chlorate, zinc chlorate, chlorate hydrates, and mixtures thereof. Water-soluble chromate salts may be selected from the group consisting of sodium chromate, ammonium chromate, magnesium chromate, calcium chromate, copper chromate, iron chromate, potassium chromate, chromate hydrates, and mixtures thereof.

Water-soluble iodide salts may be selected from the group consisting of sodium iodide, aluminum iodide, ammonium iodide, arsenic iodide, magnesium iodide, barium iodide, cadmium iodide, calcium iodide, cobalt iodide, iron iodide, nickel iodide, potassium iodide, strontium iodide, zinc iodide, iodide hydrates, and mixtures thereof.

Water-soluble nitrate salts may be selected from the group consisting of sodium nitrate, ammonium nitrate, magnesium nitrate, aluminum nitrate, barium nitrate, cadmium nitrate, calcium nitrate, chromium nitrate, cobalt nitrate, cupric nitrate, iron nitrate, lead nitrate, potassium nitrate, nickel nitrate, silver nitrate, strontium nitrate, zinc nitrate, nitrate hydrates, and mixtures thereof.

Water-soluble oxalate salts may be selected from the group consisting of sodium oxalate, chromium oxalate, iron oxalate, potassium oxalate, oxalate hydrates, and mixtures thereof.

Water-soluble sulfite salts may be selected from the group consisting of ammonium sulfite, potassium sulfite, sodium sulfite, magnesium sulfite, sulfite hydrates, and mixtures thereof.

Water-soluble citrate salts may be selected from the group consisting of potassium citrate, sodium citrate, magnesium citrate, citrate hydrates, and mixtures thereof.

Water-soluble salts may be selected from the group consisting of water soluble alkaline earth metal salts, hydrates thereof, and mixtures thereof.

If the carrier granule contains at least one water-soluble phosphate or carbonate (such as but not limited to soda ash) or sulphite salt, then the release-rate modifier may be selected from at least one water-soluble salt of at least one of the following cations: beryllium, magnesium (such as but not limited to magnesium sulfate, magnesium chloride), calcium, strontium, barium, radium, scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, thallium, antimony, bismuth, pyridinium, and mixtures thereof. For example, the release-rate modifier may be selected from $MgSO_4$ or $MgCl_2$, and the like, and combinations thereof.

If the carrier granule contains at least one water-soluble hydroxide salt, then the release-rate modifier may be selected from at least one water-soluble salt of at least one of the following cations: beryllium, magnesium (such as but not limited to magnesium sulfate, magnesium chloride), calcium, scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, antimony, bismuth, pyridinium, and mixtures thereof.

If the carrier granule contains at least one water-soluble sulfide salt, then the release-rate modifier may be selected from at least one water-soluble salt of at least one of the following cations: scandium, titanium, zirconium, hafnium, vanadium, chromium, molybdenum, tungsten, manganese, iron(II & III), ruthenium, cobalt, iridium, nickel, palladium, platinum, copper (I & II), silver, gold, zinc, cadmium, boron, aluminum, thallium, antimony, bismuth, pyridinium, and mixtures thereof.

If the carrier granule contains at least one water-soluble sulfate salt, then the release-rate modifier may be selected from at least one water-soluble salt of at least one of the following cations: calcium, strontium, barium, silver, lead, radium, and mixtures thereof.

If the carrier granule contains at least one water-soluble chloride or bromide or iodide salt, then the release-rate modifier may be selected from at least one water-soluble salt of at least one of the following cations: silver, lead, mercury, copper, thallium, and mixtures thereof.

If the carrier granule contains at least one water-soluble aluminum salt, then the release-rate modifier may be selected from at least one water-soluble salt of at least one of the following anions: hydroxide, oxide, oxalate, phosphate, silicate, and mixtures thereof.

If the carrier granule contains at least one water-soluble ammonium salt, then the release-rate modifier may be selected from at least one water-soluble oxalate salt.

If the carrier granule contains at least one water-soluble antimony salt, then the release-rate modifier may be selected from at least one water-soluble salt of at least one of the following anions: oxide, oxalate, and mixtures thereof.

If the carrier granule contains at least one water-soluble arsenic salt, then the release-rate modifier may be selected from at least one water-soluble salt of at least one of the following anions: oxide, sulfide, and mixtures thereof.

If the carrier granule contains at least one water-soluble barium salt, then the release-rate modifier may be selected from at least one water-soluble salt of at least one of the following anions: carbonate, chromate, oxalate, phosphate, sulfate, sulfite, and mixtures thereof.

If the carrier granule contains at least one water-soluble bismuth salt, then the release-rate modifier may be selected from at least one water-soluble salt of at least one of the following anions: acetate, iodide, oxide, phosphate, silicate, sulfide, and mixtures thereof.

If the carrier granule contains at least one water-soluble cadmium salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

If the carrier granule contains at least one water-soluble calcium salt, then the release-rate modifier may be selected from at least one water-soluble salt of at least one of the following anions: carbonate, hydroxide, oxide, oxalate, phosphate, silicate, sulfate, sulfide, sulfite, citrate, and mixtures thereof.

If the carrier granule contains at least one water-soluble chromium salt, then the release-rate modifier may be selected from at least one water-soluble salt of at least one of the following anions: hydroxide, iodide, oxide, phosphate, sulfide, sulfite, and mixtures thereof.

If the carrier granule contains at least one water-soluble cobalt salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

If the carrier granule contains at least one water-soluble copper salt, then the release-rate modifier may be selected from at least one water-soluble salt of at least one of the following anions: carbonate, hydroxide, oxide, oxalate, phosphate, sulfide, and mixtures thereof.

If the carrier granule contains at least one water-soluble ferric salt, then the release-rate modifier may be selected from at least one water-soluble salt of at least one of the following anions: hydroxide, oxide, phosphate, sulfide, and mixtures thereof.

If the carrier granule contains at least one water-soluble ferrous salt, then the release-rate modifier may be selected from at least one water-soluble salt of at least one of the following anions: carbonate, chromate, hydroxide, oxide, oxalate, phosphate, silicate, sulfite, sulfide, and mixtures thereof.

If the carrier granule contains at least one water-soluble lead salt, then the release-rate modifier may be selected from at least one water-soluble salt of at least one of the following anions: bromide, carbonate, chloride, chromate, hydroxide, iodide, oxide, oxalate, phosphate, silicate, sulfate, sulfite, sulfide, and mixtures thereof.

If the carrier granule contains at least one water-soluble magnesium salt, then the release-rate modifier may be selected from at least one water-soluble salt of at least one of the following anions: carbonate, hydroxide, oxide, oxalate, phosphate, silicate, and mixtures thereof.

If the carrier granule contains at least one water-soluble mercury(II) salt, then the release-rate modifier may be selected from at least one water-soluble salt of at least one of the following anions: bromide, carbonate, chromate, iodide, oxide, oxalate, sulfide, and mixtures thereof.

If the carrier granule contains at least one water-soluble mercury (I) salt, then the release-rate modifier may be selected from at least one water-soluble salt of at least one of the following anions: acetate, bromide, carbonate, chloride, chromate, iodide, oxide, oxalate, sulfate, sulfide, and mixtures thereof.

If the carrier granule contains at least one water-soluble nickel salt, then the release-rate modifier may be selected from at least one water-soluble salt of at least one of the following anions: carbonate, chlorate, hydroxide, oxide, oxalate, phosphate, sulfide, sulfite, and mixtures thereof.

If the carrier granule contains at least one water-soluble silver salt, then the release-rate modifier may be selected from at least one water-soluble salt of at least one of the following anions: acetate, bromide, carbonate, chloride, chromate, iodide, oxide, oxalate, phosphate, sulfate, sulfide, sulfite, and mixtures thereof.

If the carrier granule contains at least one water-soluble strontium salt, then the release-rate modifier may be selected from at least one water-soluble salt of at least one of the following anions: carbonate, chromate, hydroxide, oxide, oxalate, phosphate, silicate, sulfate, sulfide, sulfite, and mixtures thereof.

If the carrier granule contains at least one water-soluble zinc salt, then the release-rate modifier may be selected from at least one water-soluble salt of at least one of the following anions: carbonate, chromate, hydroxide, oxide, oxalate, phosphate, silicate, sulfide, sulfite, and mixtures thereof.

The amount of water-soluble salt (release-rate modifier) necessary to form the water-insoluble salt coating on the colored speckle may vary depending upon the nature of the salt or salt-containing carrier material and the desired performance of the resulting colored speckle. The thickness of the water-insoluble salt coating may affect the speed with which the coloring agent is released from the granule. A thicker coating layer may prolong the time it takes for the coloring agent to release from the granule. In comparison, a thinner coating may allow the coloring agent to release more quickly. As a result, the optimum ratio of salt or salt-containing carrier to release-rate modifier may be the highest carrier to release-rate modifier ratio at which desired controlled color release is enabled and which does not compromise bleed protection.

Optional Additives

Optional additives that may be included in the colored speckles include perfumes, pigments, enzymes, bleach activators, bleaches, bleach catalysts, bleach stabilizers, foam regulators (foam boosters and antifoam agents), fluorescent whitening agents, soil repellents, corrosion inhibitors, soil antiredeposition agents, soil release agents, dye transfer inhibitors, builders, complexing agents, ion exchangers, buffering agents, and mixtures thereof. Bleed inhibitors such as film forming polymers or polymeric coatings may also be included. These additives may be included in addition to the coloring agent or as the sole active ingredient into the salt or salt-containing carrier that has been modified with the water-soluble salt (release-rate modifier).

Methods for Forming the Colored Speckle

The water-insoluble salt coating formed on the surface of the colored speckle may be prepared by combining two water-soluble salt compounds in an aqueous environment and allowing the salt compounds to react with each other to form a water-insoluble salt precipitate and/or coating. Thus, one non-limiting method for preparing the water-insoluble salt coating includes applying a water soluble salt (A) to the surface of a granule comprised of water soluble salt (B) to yield a water-insoluble or minimally water-soluble precipitate of a third salt (C) that results in a delay in the release of color (or other active) from the surface or interior of the salt or salt-containing granule (B).

In one non-limiting embodiment, a colored speckle having delayed release of color may be prepared by wetting the surface of a soda ash-based carrier-coloring agent composite with a solution of either magnesium sulfate or magnesium chloride. The soda ash reacts with the magnesium sulfate salt solution (or magnesium chloride solution) to yield a precipitate of water-insoluble or minimally water-soluble magnesium carbonate that is present as a coating on the surface of the carrier-coloring agent composite. The coating imparts delayed solubility, and hence delayed color release, to the soda ash speckle.

One method for forming the colored speckles of the present invention includes the steps of providing uncolored carrier granules and loading the carrier granules into a rotating drum or other suitable mechanical device. Heat may or may not be applied to the drum. The drum may or may not have baffles or other protrusions attached to its interior walls.

A coloring agent may be added to the rotating drum. The coloring agent may be added, preferably in the form of an aqueous solution, to the drum using any conventional means for adding materials to a container. For example, the coloring agent may be sprayed into the drum. The coloring agent thus comes into contact with the carrier. The coloring agent may provide a substantially uniform coating on and/or into the carrier Next, the water-soluble salt (the "release-rate modifier"), preferably in the form of an aqueous solution, may be added to the carrier-coloring agent composite that remains in the rotating drum. The water-soluble salt may be added to the drum using any conventional means for adding materials to a container. For example, the water-soluble salt may be sprayed into the drum. The water-soluble salt thus comes into contact with the carrier-coloring agent composite. The water-soluble salt may provide a substantially uniform coating on and/or into the carrier-coloring agent composite (either by itself or through precipitation of a salt through reaction with salt/salts in carrier granule or both). The resulting colored speckle may have a final color-on-speckle loading of 0.01% to 10%, more preferably of 0.1% to 5%.

The colored speckles may then be dried. Drying may be accomplished by any conventional means known for drying particulate materials.

The general methods for preparing the colored speckle described herein may not be construed as limiting the scope of the present invention. It should be possible, by way of alternative processing methods, to combine the carrier, coloring agent, and water-soluble (release-rate modifier) to produce a colored speckle which exhibits similar delayed color release profiles for the coloring agent, as well as other desired features, as the colored speckles produced by the general methods described herein and by their equivalent methods as known to those skilled in the art. For instance, it may be possible to combine the coloring agent and the water-soluble salt (release-rate modifier) together into a mixture and then spray or otherwise apply the mixture to the carrier. It might also be possible to subsequently add additional coloring agent to the carrier to create a colored speckle having an initial release of color and then having a subsequent, delayed release of color. Also, it may be possible that a colored speckle having the desired characteristics may be manufactured by adding the carrier, the coloring agent, and the water-soluble salt (release-rate modifier) together in one step. It may also be possible that a colored speckle having the desired characteristics may be manufactured by adding the coloring agent to the carrier material prior to granulation (in the powdered form), granulating this colored powder and then adding the water-soluble salt (release-rate modifier). It may also be possible that a colored speckle having the desired characteristics may be manufactured by adding the coloring agent and the releasing agent together in one step to the carrier material prior to granulation (in the powdered form) followed by granulation.

Laundry Care Compositions

The colored speckles described in the present specification may be incorporated into a laundry care composition including but not limited to laundry detergents and fabric care compositions. Such compositions comprise one or more of the colored speckles and a laundry care ingredient.

The laundry care compositions including laundry detergents may be in solid or liquid form, including a gel form. The solid form of the laundry care compositions include, for example, compositions comprised of granules, powder, or flakes. For instance, the colored speckles of the present invention may be added to powdered laundry detergent compositions.

The colored speckles may be present in a laundry detergent composition in an amount from about 0.0001% to about 20% by weight of the composition, more preferably from about 0.0001% to about 10% by weight of the composition, and even more preferably from about 0.0001% to about 5% by weight of the composition.

The laundry detergent composition comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, preferably $C_{11-14}$ alkyl benzene sulfonic acids. Preferably the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$, n is from about 1 to 6 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In specific embodiments, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of preferred cations including sodium, potassium, ammonium, and mixtures thereof, and x is an integer of at least about 7, preferably at least about 9, and y is an integer of at least 8, preferably at least about 9; d) $C_{10}$-$C_{18}$ alkyl alkoxy sulfates (AE.sub.xS) wherein preferably x is from 1-30; e) $C_{10}$-$C_{18}$ alkyl alkoxy carboxylates preferably comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. Preferably $R^1$ is an alkyl group, which may be primary or secondary, that comprises from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. No. 6,153,577, U.S. Pat. No. 6,020,303 and U.S. Pat. No. 6,093,856; f) Alkylpolysaccharides as discussed in U.S. Pat. No. 4,565,647 to Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (preferably $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, preferably $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

As noted, the compositions may be in the form of a solid, either in tablet or particulate form, including, but not limited to particles, flakes, or the like, or the compositions may be in the form of a liquid. The liquid detergent compositions comprise an aqueous, non-surface active liquid carrier. Generally, the amount of the aqueous, non-surface active liquid carrier employed in the compositions herein will be effective to solubilize, suspend or disperse the composition components. For example, the compositions may comprise, by weight, from about 5% to about 90%, more specifically from about 10% to about 70%, and even more specifically from about 20% to about 70% of the aqueous, non-surface active liquid carrier.

The most cost effective type of aqueous, non-surface active liquid carrier is, of course, water itself. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids should be minimized to hold down composition cost. Accordingly, the aqueous liquid carrier component of the liquid detergent products herein will generally comprise water present in concentrations ranging from about 5% to about 90%, more preferably from about 20% to about 70%, by weight of the composition.

Detergent compositions may also contain bleaching agents. Suitable bleaching agents include, for example, hydrogen peroxide sources, such as those described in detail in the herein incorporated Kirk Othmer's Encyclopedia of Chemical Technology, 4th Ed (1992, John Wiley & Sons), Vol. 4, pp. 271-300 "Bleaching Agents (Survey)." These hydrogen peroxide sources include the various forms of sodium perborate and sodium percarbonate, including various coated and modified forms of these compounds.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A suitable percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators

Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. A bleach activator as used herein is any compound which, when used in conjunction with a hydrogen peroxide, source leads to the in situ production of the peracid corresponding to the bleach activator. Various non-limiting examples of activators are disclosed in U.S. Pat. Nos. 5,576,282; 4,915,854 and 4,412,934. See also U.S. Pat. No. 4,634,551 for other typical bleaches and activators useful herein.

Preferred activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 11 are those selected having an OBS or VL leaving group.

Preferred hydrophobic bleach activators include, but are not limited to, nonanoyloxybenzene-sulphonate (NOBS); 4-[N-(nonanoyl) amino hexanoyloxy]-benzene sulfonate sodium salt (NACA-OBS), an example of which is described in U.S. Pat. No. 5,523,434; dodecanoyloxybenzenesulphonate (LOBS or $C_{12}$-OBS); 10-undecenoyloxybenzenesulfonate (UDOBS or $C_{11}$-OBS with unsaturation in the 10 position); and decanoyloxybenzoic acid (DOBA).

Preferred bleach activators are those described in U.S. Pat. No. 5,998,350 to Burns et al.; U.S. Pat. No. 5,698,504 to Christie et al.; U.S. Pat. No. 5,695,679 to Christie et al.; U.S. Pat. No. 5,686,401 to Willey et al.; U.S. Pat. No. 5,686,014 to Hartshorn et al.; U.S. Pat. No. 5,405,412 to Willey et al.; U.S. Pat. No. 5,405,413 to Willey et al.; U.S. Pat. No. 5,130,045 to Mitchel et al.; and U.S. Pat. No. 4,412,934 to Chung et al., and patent application Ser. No. 08/064,564, all of which are incorporated herein by reference.

The mole ratio of peroxygen source (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP, preferably a quaternary substituted percarboxylic acid or a quaternary substituted peroxyimidic acid); more preferably, the former. Preferred QSBA structures are further described in U.S. Pat. No. 5,686, 015 to Willey et al.; U.S. Pat. No. 5,654,421 to Taylor et al.; U.S. Pat. No. 5,460,747 to Gosselink et al.; U.S. Pat. No. 5,584,888 to Miracle et al.; U.S. Pat. No. 5,578,136 to Taylor et al.; all of which are incorporated herein by reference.

Highly preferred bleach activators useful herein are amide-substituted as described in U.S. Pat. Nos. 5,698,504; 5,695, 679; and 5,686,014, each of which are cited herein above. Preferred examples of such bleach activators include: (6-octanamidocaproyl) oxybenzenesulfonate, (6-nonanamidocaproyl)oxybenzenesulfonate, (6-decanamidocaproyl) oxybenzenesulfonate and mixtures thereof.

Other useful activators are disclosed in U.S. Pat. Nos. 5,698,504; 5,695,679; and 5,686,014, each of which is cited herein above, and in U.S. Pat. No. 4,966,723 to Hodge et al. These activators include benzoxazin-type activators, such as a $C_6H_4$ ring to which is fused in the 1,2-positions a moiety —C(O)OC($R^1$)=N—.

Nitriles, such as acetonitriles and/or ammonium nitriles and other quaternary nitrogen containing nitriles, are another class of activators that are useful herein. Non-limiting examples of such nitrile bleach activators are described in U.S. Pat. Nos. 6,133,216; 3,986,972; 6,063,750; 6,017,464; 5,958,289; 5,877,315; 5,741,437; 5,739,327; 5,004,558; and in EP Nos. 790 244, 775 127, 1 017 773, 1 017 776; and in WO 99/14302, WO 99/14296, WO96/40661, all of which are incorporated herein by reference.

Depending on the activator and precise application, good bleaching results can be obtained from bleaching systems having an in-use pH of from about 6 to about 13, and preferably from about 9.0 to about 10.5. Typically, for example, activators with electron-withdrawing moieties are used for near-neutral or sub-neutral pH ranges. Alkalis and buffering agents can be used to secure such pH.

Acyl lactam activators, as described in U.S. Pat. Nos. 5,698,504; 5,695,679 and 5,686,014, each of which is cited herein above, are very useful herein, especially the acyl caprolactams (see for example WO 94-28102 A) and acyl valerolactams (see U.S. Pat. No. 5,503,639 to Willey et al. incorporated herein by reference).

(b) Organic Peroxides, Especially Diacyl Peroxides

These are extensively illustrated in Kirk Othmer, Encyclopedia of Chemical Technology, Vol. 17, John Wiley and Sons, 1982 at pages 27-90 and especially at pages 63-72, all incorporated herein by reference. If a diacyl peroxide is used, it will preferably be one which exerts minimal adverse impact on fabric care, including color care.

(c) Metal-Containing Bleach Catalysts

The compositions and methods of the present invention can also optionally include metal-containing bleach catalysts, preferably manganese and cobalt-containing bleach catalysts.

One type of metal-containing bleach catalyst is a catalyst system comprising a transition metal cation of defined bleach catalytic activity (such as copper, iron, titanium, ruthenium tungsten, molybdenum, or manganese cations), an auxiliary metal cation having little or no bleach catalytic activity (such as zinc or aluminum cations), and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 to Bragg.

Manganese Metal Complexes

If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1; 549,272 A1; 544,440 A2; and 544,490 A1. Preferred examples of these catalysts include $Mn^{IV}_2(u-O)_3(1,4,7$-trimethyl-1,4,7-triazacyclononane$)_2(PF_6)_2$, $Mn^{III}_2(u-O)_1(u-OAc)_2(1,4,7$-trimethyl-1,4,7-triazacyclononane$)_2(ClO_4)_2$, $Mn^{IV}_4(u-O)_6(1,4,7$-triazacyclononane$)_4(ClO_4)_4$, $Mn^{III}Mn^{IV}_4(u-O)_1(u-OAc)_2$-(1, 4,7-trimethyl-1,4,7-triazacyclononane$)_2(ClO_4)_3$, $Mn^{IV}(1,4, 7$-trimethyl-1,4,7-triazacyclononane)-$(OCH_3)_3(PF_6)$, and mixtures thereof. Other metal-based bleach catalysts include those disclosed in U.S. Pat. Nos. 4,430,243 and 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes

Cobalt bleach catalysts useful herein are known, and are described, for example, in U.S. Pat. Nos. 5,597,936; 5,595, 967; and 5,703,030; and M. L. To be, "Base Hydrolysis of Transition-Metal Complexes", *Adv. Inorg. Bioinorg. Mech.*, (1983), 2, pages 1-94. The most preferred cobalt catalyst useful herein are cobalt pentaamine acetate salts having the formula $[Co(NH_3)_6OAc]$ $T_y$, wherein "OAc" represents an acetate moiety and "$T_y$" is an anion, and especially cobalt pentaamine acetate chloride, $[Co(NH_3)_5OAc]Cl_2$; as well as $[Co(NH_3)_6OAc](OAc)_2$; $[Co(NH_3)_6OAc](PF_6)_2$; $[Co(NH_3)_6 OAc]SO_4)$; $[Co(NH_3)_5OAc](BF_4)_2$; and $[Co(NH_3)_5OAc] (NO_3)_2$ (herein "PAC").

These cobalt catalysts are readily prepared by known procedures, such as taught for example in U.S. Pat. Nos. 6,302, 921; 6,287,580; 6,140,294; 5,597,936; 5,595,967; and 5,703, 030; in the To be article and the references cited therein; and in U.S. Pat. No. 4,810,410; *J. Chem. Ed.* (1989), 66 (12), 1043-45; The Synthesis and Characterization of Inorganic Compounds, W. L. Jolly (Prentice-Hall; 1970), pp. 461-3; *Inorg. Chem.*, 18, 1497-1502 (1979); *Inorg. Chem.*, 21, 2881-

2885 (1982); *Inorg. Chem.*, 18, 2023-2025 (1979); *Inorg. Synthesis*, 173-176 (1960); and *Journal of Physical Chemistry*, 56, 22-25 (1952).

Transition Metal Complexes of Macropolycyclic Rigid Ligands

Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition-metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and are non-limitingly illustrated by any of the following:

Dichloro-5,12-dimethyl-1,5,8,12-tetraazabicyclo[6.6.2] hexadecane Manganese(II)
Dichloro-5,12-diethyl-1,5,8,12-tetraazabicyclo[6.6.2]hexadecane Manganese(II)
Diaquo-5,12-dimethyl-1,5,8,12-tetraazabicyclo[6.6.2]hexadecaneManganese(II) Hexafluorophosphate
Diaquo-5,12-diethyl-1,5,8,12-tetraazabicyclo[6.6.2]hexadecaneManganese(II) Hexafluorophosphate
Aquo-hydroxy-5,12-dimethyl-1,5,8,12-tetraazabicyclo [6.6.2]hexadecane Manganese(III) Hexafluorophosphate
Diaquo-5,12-dimethyl-1,5,8,12-tetraazabicyclo[6.6.2]hexadecaneManganese(II) Tetrafluoroborate
Dichloro-5,12-dimethyl-1,5,8,12 tetraazabicyclo[6.6.2] hexadecane Manganese(III) Hexafluorophosphate
Dichloro-5,12-diethyl-1,5,8,12-tetraazabicyclo[6.6.2]hexadecaneManganese(III) Hexafluorophosphate
Dichloro-5,12-di-n-butyl-1,5,8,12-tetraaza bicyclo[6.6.2] hexadecane Manganese(II)
Dichloro-5,12-dibenzyl-1,5,8,12-tetraazabicyclo[6.6.2] hexadecaneManganese(II)
Dichloro-5-n-butyl-12-methyl-1,5,8,12-tetraaza-bicyclo [6.6.2]hexadecane Manganese(II)
Dichloro-5-n-octyl-12-methyl-1,5,8,12-tetraaza-bicyclo [6.6.2]hexadecane Manganese(II)
Dichloro-5-n-butyl-12-methyl-1,5,8,12-tetraaza-bicyclo [6.6.2]hexadecane Manganese(II).

As a practical matter, and not by way of limitation, the compositions and methods herein can be adjusted to provide on the order of at least one part per hundred million of the active bleach catalyst species in the composition comprising a lipophilic fluid and a bleach system, and will preferably provide from about 0.01 ppm to about 25 ppm, more preferably from about 0.05 ppm to about 10 ppm, and most preferably from about 0.1 ppm to about 5 ppm, of the bleach catalyst species in the composition comprising a lipophilic fluid and a bleach system.

(d) Bleach Boosting Compounds

The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

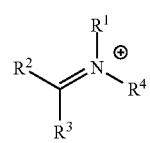

[I]

where $R^1$-$R^4$ may be a hydrogen or an unsubstituted or substituted radical selected from the group consisting of phenyl, aryl, heterocyclic ring, alkyl and cycloalkyl radicals.

Among preferred bleach boosting compounds are zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are preferably employed in conjunction with a peroxygen source in the bleaching systems of the present invention.

(e) Preformed Peracids

Also suitable as bleaching agents are preformed peracids. The preformed peracid compound as used herein is any convenient compound which is stable and which under consumer use conditions provides an effective amount of peracid or peracid anion. The preformed peracid compound may be selected from the group consisting of percarboxylic acids and salts, percarbonic acids and salts, perimidic acids and salts, peroxymonosulfuric acids and salts, and mixtures thereof. Examples of these compounds are described in U.S. Pat. No. 5,576,282 to Miracle et al.

One class of suitable organic peroxycarboxylic acids have the general formula:

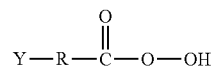

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Organic peroxyacids suitable for use in the present invention can contain either one or two peroxy groups and can be either aliphatic or aromatic. When the organic peroxycarboxylic acid is aliphatic, the unsubstituted peracid has the general formula:

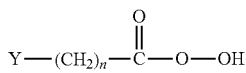

wherein Y can be, for example, H, CH$_3$, CH$_2$Cl, C(O)OH, or C(O)OOH; and n is an integer from 0 to 20. When the organic peroxycarboxylic acid is aromatic, the unsubstituted peracid has the general formula:

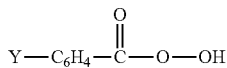

wherein Y can be, for example, hydrogen, alkyl, alkylhalogen, halogen, C(O)OH or C(O)OOH.

Typical monoperoxy acids useful herein include alkyl and aryl peroxyacids such as:
(i) peroxybenzoic acid and ring-substituted peroxybenzoic acid, e.g. peroxy-a-naphthoic acid, monoperoxyphthalic acid (magnesium salt hexahydrate), and o-carboxybenzamidoperoxyhexanoic acid (sodium salt);
(ii) aliphatic, substituted aliphatic and arylalkyl monoperoxy acids, e.g. peroxylauric acid, peroxystearic acid, N-nonanoylaminoperoxycaproic acid (NAPCA), N,N-(3-octylsuccinoyl)aminoperoxycaproic acid (SAPA) and N,N-phthaloylaminoperoxycaproic acid (PAP);
(iii) amidoperoxyacids, e.g. mononylamide of either peroxysuccinic acid (NAPSA) or of peroxyadipic acid (NAPAA).

Typical diperoxyacids useful herein include alkyl diperoxyacids and aryldiperoxyacids, such as:
(i) 1,12-diperoxydodecanedioic acid;
(ii) 1,9-diperoxyazelaic acid;
(iii) diperoxybrassylic acid; diperoxysebacic acid and diperoxyisophthalic acid;
(iv) 2-decyldiperoxybutane-1,4-dioic acid;
(v) 4,4'-sulfonylbisperoxybenzoic acid.

Such bleaching agents are disclosed in U.S. Pat. Nos. 4,483,781 to Hartman and 4,634,551 to Burns et al.; European Patent Application 0,133,354 to Banks et al.; and U.S. Pat. No. 4,412,934 to Chung et al. Sources also include 6-nonylamino-6-oxoperoxycaproic acid as described in U.S. Pat. No. 4,634,551 to Burns et al. Persulfate compounds such as for example OXONE, manufactured commercially by E.I. DuPont de Nemours of Wilmington, Del. can also be employed as a suitable source of peroxymonosulfuric acid. PAP is disclosed in, for example, U.S. Pat. Nos. 5,487,818; 5,310,934; 5,246,620; 5,279,757 and 5,132,431.

(f) Photobleaches

Suitable photobleaches for use in the treating compositions of the present invention include, but are not limited to, the photobleaches described in U.S. Pat. Nos. 4,217,105 and 5,916,481.

(g) Enzyme Bleaching

Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

The detergent compositions of the present invention may also include any number of additional optional ingredients. These include conventional laundry detergent composition components such as non-tinting dyes, detersive builders, enzymes, enzyme stabilizers (such as propylene glycol, boric acid and/or borax), suds suppressors, soil suspending agents, soil release agents, other fabric care benefit agents, pH adjusting agents, chelating agents, smectite clays, solvents, hydrotropes and phase stabilizers, structuring agents, dye transfer inhibiting agents, opacifying agents, optical brighteners, perfumes and coloring agents. The various optional detergent composition ingredients, if present in the compositions herein, should be utilized at concentrations conventionally employed to bring about their desired contribution to the composition or the laundering operation. Frequently, the total amount of such optional detergent composition ingredients can range from about 0.01% to about 50%, more preferably from about 0.1% to about 30%, by weight of the composition.

The liquid detergent compositions are in the form of an aqueous solution or uniform dispersion or suspension of surfactant, whitening agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, more preferably from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a preferred process for preparing such compositions, a liquid matrix is formed containing at least a major proportion, and preferably substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

As noted previously, the detergent compositions may be in a solid form. Suitable solid forms include tablets and particulate forms, for example, granular particles or flakes. Various techniques for forming detergent compositions in such solid forms are well known in the art and may be used herein. In one embodiment, for example when the composition is in the form of a granular particle, the colored speckles are provided in particulate form, optionally including additional but not all components of the laundry detergent composition. The colored speckles are combined with one or more additional particulates containing a balance of components of the laundry detergent composition.

The compositions of this invention, prepared as hereinbefore described, can be used to form aqueous washing solutions for use in the laundering of fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the detergent compositions herein added to water to form aqueous laundering solutions can comprise amounts sufficient to form from about 500 to 7,000 ppm of composition in aqueous washing solution. More preferably, from about 1,000 to 3,000 ppm of the detergent compositions herein may be provided in aqueous washing solution.

Fabric Care Compositions/Rinse Added Fabric Softening Compositions

In another specific embodiment, the colored speckles of the present invention may be included in a fabric care composition. The fabric care composition may be comprised of colored speckles and a rinse added fabric softening composition ("RAFS;" also known as rinse added fabric conditioning compositions). Examples of typical rinse added softening compositions can be found in U.S. Provisional Patent Application Ser. No. 60/687,582 filed on Oct. 8, 2004. The rinse added fabric softening compositions of the present invention may comprise (a) fabric softening active ("FSA") and (b) colored speckles. The rinse added fabric softening composition may comprise from about 1% to about 90% by weight of the FSA, more preferably from about 5% to about 50% by weight of the FSA.

In one embodiment of the invention, the fabric softening active is a quaternary ammonium compound suitable for softening fabric in a rinse step. In one embodiment, the FSA is formed from a reaction product of a fatty acid and an aminoalcohol obtaining mixtures of mono-, di-, and, in one embodiment, triester compounds. In another embodiment, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain embodiments of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

wherein each R substituent is either hydrogen, a short chain $C_1$-$C_6$, preferably $C_1$-$C_3$ alkyl or hydroxyalkyl group, e.g., methyl (most preferred), ethyl, propyl, hydroxyethyl, and the like, poly ($C_{2-3}$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$—$O_{22}$, preferably $C_{14}$—$O_{20}$, with each $R^1$ being a hydrocarbyl, or substituted hydrocarbyl group; it is acceptable for $R^1$ to be unsaturated or saturated and branched or linear and preferably it is linear; it is acceptable for each $R^1$ to be the same or different and preferably these are the same; and $X^-$ can be any softener-compatible anion, preferably, chloride, bromide, methylsulfate, ethylsulfate, sulfate, phosphate, and nitrate, more preferably chloride or methyl sulfate. Preferred DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one embodiment, the FSA comprises other actives in addition to DQA (1) or DQA. In yet another embodiment, the FSA comprises only DQA (1) or DQA and is free or essentially free of any other quaternary ammonium compounds or other actives. In yet another embodiment, the FSA comprises the precursor amine that is used to produce the DQA.

In another aspect of the invention, the FSA comprises a compound, identified as DTTMAC comprising the formula:

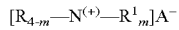

wherein each m is 2 or 3, each $R^1$ is a $C_6$-$C_{22}$, preferably $C_{14}$-$C_{20}$, but no more than one being less than about $C_{12}$ and then the other is at least about 16, hydrocarbyl, or substituted hydrocarbyl substituent, preferably $C_{10}$-$C_{20}$ alkyl or alkenyl (unsaturated alkyl, including polyunsaturated alkyl, also referred to sometimes as "alkylene"), most preferably $C_{12}$-$C_{18}$ alkyl or alkenyl, and branch or unbranched. In one embodiment, the Iodine Value (IV) of the FSA is from about 1 to 70; each R is H or a short chain $C_1$-$C_6$, preferably $C_1$-$C_3$ alkyl or hydroxyalkyl group, e.g., methyl (most preferred), ethyl, propyl, hydroxyethyl, and the like, benzyl, or $(R^2O)_{2-4}H$ where each $R^2$ is a $C_{1-6}$ alkylene group; and $A^-$ is a softener compatible anion, preferably, chloride, bromide, methylsulfate, ethylsulfate, sulfate, phosphate, or nitrate; more preferably chloride or methyl sulfate.

Examples of these FSAs include dialkydimethylammonium salts and dialkylenedimethylammonium salts such as ditallowedimethylammonium and ditallowedimethylammonium methylsulfate. Examples of commercially available dialkylenedimethylammonium salts usable in the present invention are di-hydrogenated tallow dimethyl ammonium chloride and ditallowedimethyl ammonium chloride available from Degussa under the trade names Adogen® 442 and Adogen® 470 respectively. In one embodiment, the FSA comprises other actives in addition to DTTMAC. In yet another embodiment, the FSA comprises only compounds of the DTTMAC and is free or essentially free of any other quaternary ammonium compounds or other actives.

In one embodiment, the FSA comprises an FSA described in U.S. Pat. Pub. No. 2004/0204337 A1, published Oct. 14, 2004 to Corona et al., from paragraphs 30-79. In another embodiment, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one embodiment, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one embodiment, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another specific embodiment of the invention provides for a rinse added fabric softening is composition further comprising a cationic starch. Cationic starches are disclosed in US 2004/0204337 A1. In one embodiment, the rinse added fabric softening composition comprises from about 0.1% to about 7% of cationic starch by weight of the fabric softening composition. In one embodiment, the cationic starch is HCP401 from National Starch.

Suitable Laundry Care Ingredients

While not essential for the purposes of the present invention, the non-limiting list of laundry care ingredients illustrated hereinafter are suitable for use in the laundry care compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular embodiment. The total amount of such adjuncts may range from about 0.1% to about 50%, or even from about 1% to about 30%, by weight of the laundry care composition.

The precise nature of these additional components, and levels of incorporation thereof, will depend on the physical form of the composition and the nature of the operation for which it is to be used. Suitable laundry care ingredients include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to the laundry care compositions. Thus, certain embodiments of these compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes—Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in WO 00/32601, and U.S. Pat. No. 6,225,464.

EXAMPLES

The invention may be further understood by reference to the following examples which are not to be construed as limiting the scope of the present invention. The indication of "N/A" is used when no data or no additional data is available.

A. Preparation of Colored Speckles

The following procedures were used to prepare colored speckles:

Colored Speckle Preparation (Sample A)

1. 50 g of uncolored soda ash granules (W9 grade from Brunner Mond) were loaded into a rotating drum.
2. 1 g of Blue SE (polymeric colorant from Milliken Chemical) was diluted with 5 g of water.
3. The solution of step 2 was sprayed onto the tumbling granules of step 1.
4. The colored granules were removed from the drum and allowed to air dry overnight.
5. The resulting colored speckles were Sample A.

Colored Speckle Preparation (Samples B1-B7)

The following procedure was used to further modify the colored soda ash speckles of Sample A with salt solutions:
1. The following aqueous salt solutions were prepared:
   (B1) 17 g $MgSO_4$+50 g deionized water;
   (B2) 30 wt % $MgCl_2$ aqueous solution (available as Catalyst KR from OMNOVA);
   (B3) 15 g NaCl+50 g DI water;
   (B4) 10 g $Na_2SO_4$+50 g DI water;
   (B5) 10 wt % STPP (sodium tripolyphosphate) aqueous solution;
   (B6) 20 wt % Na-polysilicate ($SiO_2/Na_2O$=2.4, Britesil H24); and
   (B7) 20 wt % Na-metasilicate (Metso Beads 2048).
2. An aqueous solution containing 10 g $Na_2CO_3$+50 g DI water was also prepared (solution "C1")
3. 1 g of the colored speckles prepared as Sample A was placed in a plastic cup.
4. 0.2 g of Solution 1(a) was added to the colored speckles of Step 2.
5. The mixture was stirred and placed in a 60-80° C. oven for 1-2 minutes.
6. Steps 3-5 were repeated for each of the remaining solutions listed in Step 1.
7. After 1-2 minutes in the oven (Step 5), the samples were removed from the oven and allowed to cool overnight.
8. The resulting samples were thus prepared:
   Sample B1—Sample A colored speckles modified with $MgSO_4$;
   Sample B2—Sample A colored speckles modified with $MgCl_2$;
   Sample B3—Sample A colored speckles modified with NaCl;
   Sample B4—Sample A colored speckles modified with $Na_2SO_4$;
   Sample B5—Sample A colored speckles modified with 10 wt % STPP;
   Sample B6—Sample A colored speckles modified with 20 wt % Na-polysilicate;
   Sample B7—Sample A colored speckles modified with Na-metasilicate.

B. Test Methods

The following test procedure was used to qualitatively differentiate the rates of color release and dissolution of the colored soda ash speckles.
1. 5 plastic cups were with filled with 100 ml of tap water.
2. 0.1 g of each sample was place in each cup.
3. Visual observations were made of the cups were made at 30 seconds, 2 minutes and 3.5 minutes. Photographs were also taken.
4. The visual observations were recorded.

C. Test Results

Visual observations of the colored speckles indicate that the colored speckles of Sample A (unmodified colored soda ash speckles) release their color almost instantly when dropped into water. Instant release of color turned the water in the cup to a blue color.

Modifying colored soda ash speckles with NaCl, $Na_2SO_4$, STPP and Na-metasilicate (Samples B3, B4, B5 and B7, respectively) does not appear to affect the release rate of color or the dissolution rate of the soda ash speckles. By the 3.5 minute mark, complete dissolution of Samples A, B3, B4, B5 and B7 was observed.

In contrast, a reduction in release rate of color and in the dissolution rate of soda ash speckles is observed for those colored speckles treated with $MgSO_4$, $MgCl_2$ and Na-polysilicate solutions (Samples B1, B2 and B6 respectively). After complete dissolution of the $MgSO_4$ and $MgCl_2$ treated soda ash speckles (at 5-10 minutes and 10-15 minutes, respectively), white "speckle shells" were observed floating on the surface of the water. After complete dissolution of the Na-polysilicate treated soda ash speckles (between 3 and 5 minutes), white "speckle shells" were observed floating on the surface of the water. No such un-dissolved material was observed in the case of the untreated/unmodified speckles (Sample A) or in the speckles treated with NaCl, $Na_2SO_4$, STPP or Na-metasilicate soda ash speckles (Samples B3, B4, B5 and B7, respectively).

Test results are summarized in Table 1 below.

TABLE 1

Rate of Color Release and Dissolution

| Sample | Instant Release of Color? | Visual Observations | | Comments |
|---|---|---|---|---|
| | | At 2 Minutes | At 3.5 Minutes | |
| Sample A | Yes | Speckles almost completely dissolved; all color in solution. | Speckles appear to have completely dissolved. | No un-dissolved material floating on surface. |
| Sample B1 | No | Speckles partially dissolved; color still in process of being released; very little color in solution. | Much greater amount of each speckle is dissolved; color still in process of being released; more color in solution than at 2 minutes. | White speckle shells observed floating on surface. |
| Sample B2 | No | Speckles not dissolved; no color release; almost no color in solution. | Speckles still not dissolved; minimal color release; almost no color in solution. | White speckle shells observed floating on surface after 15 minutes. Color in solution. Speckles dissolved. |
| Sample B3 | Yes | Speckles almost completely dissolved; all color in solution. | Speckles appear to have completely dissolved. | No un-dissolved material floating on surface. |
| Sample B4 | Yes | Speckles almost completely dissolved; all color in solution. | Speckles appear to have completely dissolved. | No un-dissolved material floating on surface. |
| Sample B5 | Yes | Speckles almost completely dissolved; all color in solution. | Speckles appear to have completely dissolved. | No un-dissolved material floating on surface. |
| Sample B6 | No | Speckles partially dissolved; color still in process of being released; very little color in solution. | Much greater amount of each speckle is dissolved; color still in process of being released; more color in solution than at 2 minutes. | White speckle shells observed floating on surface. |
| Sample B7 | Yes | Speckles almost completely dissolved; all color in solution. | Speckles appear to have completely dissolved. | No un-dissolved material floating on surface. |

In further experiments, aqueous salt solutions, Samples C1-C7, were made according to the methods described herein. In these instances, no coloring agent was included. These samples were made as follows:

Sample C-1: Equal volumes of $MgSO_4$ (B1) and $Na_2CO_3$ (C1) (soda ash) solutions were mixed together. A white precipitate was observed.

Sample C-2: Equal volumes of $MgCl_2$ (B2) and $Na_2CO_3$ (C1) (soda ash) solutions were mixed together. A white precipitate was observed.

Sample C-3: Equal volumes of $Na_2SO_4$ (B4) and $Na_2CO_3$ (C1) (soda ash) solutions were mixed together. No precipitate was observed.

Sample C-4: Equal volumes of NaCl (B3) and $Na_2CO_3$ (C1) (soda ash) solutions were mixed together. No precipitate was observed.

Sample C-5: Equal volumes of STPP (B5) and $Na_2CO_3$ (C1) (soda ash) solutions were mixed together. No precipitate was observed.

Sample C-6: Equal volumes of Na-polysilicate (B6) and $Na_2CO_3$ (C1) (soda ash) solutions were mixed together. No precipitate was observed.

Sample C-7: Equal volumes of Na-metasilicate (B7) and $Na_2CO_3$ (C1) (soda ash) solutions were mixed together. No precipitate was observed.

Herein we described a method for modifying the soda ash speckles with salt solutions that delays the dissolution rate of the soda ash speckles and also/thereby reduces the release rate of the color into the wash water solution. This modification inherently reduces the dissolution rate of soda ash speckles so that even uncolored 100% soda ash granules would dissolve at a slower rate after being treated with the salt solution.

Without being bound by theory, it is believed that $MgSO_4$ and $MgCl_2$ reacted with the $Na_2CO_3$ (soda ash) to form water insoluble $MgCO_3$ salt, which was observable as a white precipitate in Samples C1 and C2 and as white speckle shells in Samples B1 and B2. The water-insoluble shell of $MgCO_3$ that formed on the outside of the colored soda ash speckles that were treated with $MgSO_4$ and $Na_2CO_3$ was responsible for the slower dissolution of these speckles and consequently the slower release rate of color from these speckles.

In contrast, the test results indicate that $Na_2SO_4$, NaCl, STPP, Na-metasilicate and Na-polysilicate did not react with the soda ash speckles to produce any such water-insoluble salt. No suppression in color release or dissolution rate was observed for soda ash speckles treated with $Na_2SO_4$, NaCl, STPP or Na-metasilicate.

However, Na-polysilicate was able to suppress the release of color from the surface of the soda ash granule, even though it did not appear to react with the soda ash granules to form a water-insoluble salt. Thus, these results indicate that a water soluble salt may not necessary have to react with the salt granule to which it is being applied in order to delay the color release from the speckle. Thus, it may not be necessary to form a precipitate of insoluble salt in order to achieve delayed release of color from the speckle. Na-polysilicate appears to achieve this result without undergoing any such reaction with soda ash in solution.

While these test results focus on soda ash speckles and the formation of water-insoluble salts, it is believed that these techniques could be use to moderate or tune the dissolution rate of additional types of salt granules by treating them with specific salt solutions that would result in the formation of other water-insoluble salts. Specific but non limiting examples include a) the treatment of sodium sulfate speckles with calcium acetate to give an insoluble precipitate/coating of calcium sulfate, and b) the treatment of sodium chloride speckles with silver nitrate to give an insoluble precipitate of silver chloride.

The test results illustrate that treating colored soda ash granules with magnesium sulfate and magnesium chloride allowed a delay in the release of color from the surface of those speckles or granules. The test results also demonstrated that this effect is applicable for combinations of water soluble salts that reacted to form a third water-insoluble salt. For example, test results indicate that no such delay in color release was observed for soda ash granules that were similarly treated with NaCl and $Na_2SO_4$ (both of which do not form insoluble precipitates with soda ash). These test results were further supported by the observation that solutions of NaCl and $Na_2SO_4$ did not provide any precipitate material when added to aqueous soda ash solutions, but solutions of magnesium sulfate and chloride did provide such precipitate material.

This effect (delayed color release, bleed protection, etc.) is believed to work with any combination of water-soluble salts that react to form a third water-insoluble salt. The methods described herein teach that any water soluble salt (A) when applied to the surface of a granule comprising another water soluble salt (B) will yield a water-insoluble precipitate of a third salt (C). The presence of the water-insoluble third salt (C) causes a delay in the release of color adsorbed to the surface of the salt granule (B).

Further observations were made about the appearance of the colored speckles after treatment with the various salt solutions. It was observed that amongst the salts used to treat the colored soda ash speckles (Samples B1 to B7), only the ones that reacted with the soda ash to give insoluble precipitates made the speckles appear noticeably lighter (i.e. $MgSO_4$ and $MgCl_2$ which reacted with soda ash to give magnesium carbonate, a white precipitate). Even though Na-polysilicate delayed the release of the coloring agent from the colored soda ash speckles, no change in the color of the speckles was observed after the treatment with Na-polysilicate. This is believed to be due to the fact that Na-polysilicate did not react with the soda ash to give any precipitate.

Our method of combining the water soluble salt/salts in the carrier granule with the release-rate modifying water-soluble salt to give an insoluble or minimally soluble salt precipitate therefore has an added and unexpected advantage of influencing the color of the final speckles. If the insoluble or minimally soluble salt precipitate is white (as in the case of magnesium sulfate), then the colored speckles will become lighter after the salt has precipitated on the surfaces of those colored speckles thereby providing a unique aesthetic benefit. This effect was not obtained with Na-polysilicate which did not react with the soda ash to give any precipitate (and as a result, the speckles retained their original dark color).

Furthermore, if the insoluble precipitate was a color other than white (e.g. red, blue, green, yellow, etc.), it may be possible to impart unique colored effects to the underlying speckle. For example, a blue precipitate (copper carbonate for example is water-insoluble and blue-green in color) may be used to enhance the perception of whiteness of an uncolored granule on which it is deposited or to deliver simple aesthetic effects on speckles.

Thus, the above description and examples show that the inventive colored speckles provide delayed release of non-staining color (this concept may also be applied to achieve delayed/controlled/tunable release of pigments and dyes) and bleed resistance to various detergent formulations with which they may be combined. As has been described herein, the inventive colored speckles possess a significant advantage over currently available colored speckles by allowing controlled release of color into wash water, while still preserving bleed resistance and good non-staining properties and also providing improved aesthetics. As such, the present colored speckles represent a useful advance over the prior art.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

It is claimed:

1. A colored speckle comprising:
   a) a majority by weight of at least one salt or salt-containing carrier material;
   b) at least one coloring agent; and
   c) at least one water-insoluble salt coating;
   wherein the at least one carrier material and the at least one coloring agent form a carrier-coloring agent composite, and
   wherein the at least one water-insoluble salt coating is a product of a reaction between the carrier material and a water-soluble salt.

2. The colored speckle of claim 1, wherein the at least one salt or salt-containing carrier material is selected from the group consisting of lithium salts, sodium salts, potassium salts, rubidium salts, cesium salts, francium salts, beryllium salts, magnesium salts, calcium salts, strontium salts, barium salts, radium salts, scandium salts, titanium salts, zirconium salts, hafnium salts, vanadium salts, chromium salts, molybdenum salts, tungsten salts, manganese salts, iron salts (II & III), ruthenium salts, cobalt salts, iridium salts, nickel salts, palladium salts, platinum salts, copper (I & II) salts, silver salts, gold salts, zinc salts, cadmium salts, boron salts, aluminum salts, thallium salts, antimony salts, bismuth salts, ammonium salts, quaternary ammonium salts, pyridinium salts, nitrate salts, nitrite salts, chloride salts, chlorate salts, chromate salts, cyanate salts, cyanide salts, fluoride salts, acetate salts, bromide salts, boride salts, iodide salts, sulfate salts, sulfite salts, sulfide salts, sulfamate salts, sulfonate salts, carbonate salts, bicarbonate salts, ascorbate salts, phosphate salts, polyphosphate salts, citrate salts, oxides, hydroxides, cyanides salts, permanganates, adipates, benzoates, fluorides, silicate, lactates, malates, perchlorates, persulfates, oxalates, organic salts, alkali metal aluminosilicates, borax, clay, silica, zeolite, diatomaceous earth, mica, talc, chalk, gypsum, lithopone, titanium dioxide, barytes, silica flatting agents, and combinations thereof.

3. The colored speckle of claim 2, wherein the sodium salts are selected from the group consisting of sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium thiosulfate, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium malate, sodium stearate, sodium lauryl sulfate, sodium benzoate, sodium bromate, sodium formate, sodium pyrophosphate, sodium selenate, sodium periodate, sodium molybdate, sodium hydrates, and mixtures thereof.

4. The colored speckle of claim 2, wherein the magnesium salts are selected from the group consisting of magnesium sulfate, magnesium chloride, magnesium acetate, magnesium chlorate, magnesium chloride, magnesium chromate, magnesium iodide, magnesium nitrate, magnesium thiosulfate, magnesium selenate, magnesium perchlorate, magnesium formate, magnesium bromide, magnesium sulfite, magnesium citrate, magnesium fluorosilicate, magnesium hydrates, and mixtures thereof.

5. The colored speckle of claim 2, wherein the carbonate salts are selected from the group consisting of sodium carbonate, sodium percarbonate, potassium carbonate, ammonium carbonate, carbonate hydrates, and mixtures thereof.

6. The colored speckle of claim 1, wherein the at least one salt or salt-containing carrier material exhibits an average particle size of between about 0.1 mm and about 2 mm.

7. The colored speckle of claim 1, wherein the at least one salt or salt-containing carrier material exhibits an average particle size of between about 0.3 mm and about 1.5 mm.

8. The colored speckle of claim 1, wherein the water-soluble salt is selected from the group consisting of water-soluble salts of beryllium, magnesium, calcium, strontium, barium, lead, radium, scandium, titanium, zirconium, hafnium, vanadium, chromium, molybdenum, tungsten, manganese, iron(II & III), ruthenium, cobalt, iridium, nickel, palladium, platinum, mercury, copper (I & II), silver, gold, zinc, cadmium, boron, aluminum, thallium, antimony, bismuth, pyridinium, ammonium, quaternary ammonium, nitrate, nitrite, hydroxide, oxide, oxalate, phosphate, silicate, sulfide, carbonate, chromate, chlorate, sulfate, sulfite, acetate, citrate, iodide, bromide, chloride, hydrates thereof, and mixtures thereof.

9. The colored speckle of claim 8, wherein water-soluble salts of magnesium are selected from the group consisting of magnesium sulfate, magnesium chloride, magnesium acetate, magnesium chlorate, magnesium chromate, magnesium iodide, magnesium nitrate, magnesium perchlorate, magnesium bromide, magnesium sulfite, magnesium citrate, magnesium hydrates, and mixtures thereof.

10. The colored speckle of claim 8, wherein water-soluble salts of sodium are selected from the group consisting of sodium sulfate, sodium bisulfate, sodium carbonate, sodium tripolyphosphate, sodium polyphosphate, sodium phosphates, monosodium phosphate, sodium hydrogen phosphate, sodium dihydrogen phosphate, sodium chloride, sodium bicarbonate, sodium percarbonate, sodium nitrate, sodium nitrite, sodium acetate, sodium bromide, sodium chlorate, sodium perchlorate, sodium chromate, sodium dichromate, sodium iodide, sodium iodate, sodium oxalate, sodium silicate, sodium sulfide, sodium sulfite, sodium bisulfite, sodium citrate, sodium stearate, sodium benzoate, sodium bromate, sodium formate, sodium hydrates, and mixtures thereof.

11. The colored speckle of claim 8, wherein the water-soluble carbonate salts are selected from the group consisting of sodium carbonate, sodium percarbonate, potassium carbonate, ammonium carbonate, carbonate hydrates, and mixtures thereof.

12. The colored speckle of claim 1, wherein the coloring agent is selected from the group consisting of polymeric colorants, acid dyes, basic dyes, direct dyes, solvent dyes, vat dyes, mordant dyes, indigoid dyes, reactive dyes, disperse dyes, sulfur dyes, fluorescent dyes, inorganic pigments, organic pigments, natural colorants, and mixtures thereof.

13. The colored speckle of claim 12, wherein the coloring agent is a polymeric colorant.

14. The colored speckle of claim 13, wherein the polymeric colorant is characterized by having a chromophore group is selected from the group consisting of nitroso, nitro, azo and metal complexes thereof, stilbene, bis-stilbene, biphenyl, oligophenethylene, fluorene, coumarin, naphthalamide, diarylmethane, triarylmethane, xanthene acridine, quinoline, methane, polymethine, thiazole, indamine, indophenol, azine, thiazine, oxazine, aminoketone, hydroxyketone, anthraquinone indigoid, thioindigoid, phthalocyanine chromophore groups, and mixtures thereof.

15. A powdered detergent formulation comprising the colored speckle of claim 1.

16. A colored speckle comprising:
a) a majority by weight of at least one salt or salt-containing carrier material;
b) at least one polymeric coloring agent; and
c) at least one water-insoluble salt coating;
wherein the at least one carrier material and the at least one polymeric coloring agent form a carrier-coloring agent composite, and
wherein the at least one water-insoluble salt coating is a product of a reaction between the carrier material and a water-soluble salt.

17. The colored speckle of claim 16, wherein the at least one salt or salt-containing carrier material is sodium carbonate.

18. The colored speckle of claim 16, wherein the water-soluble salt is selected from the group consisting of magnesium sulfate, magnesium chloride, and mixtures thereof.

19. A method for forming a colored speckle comprising the steps of:
(a) providing at least one salt or salt-containing carrier material;
(b) applying at least one coloring agent to the at least one salt or salt-containing carrier material to form a carrier-coloring agent composite;
(c) applying at least one water-soluble salt to the carrier-coloring agent composite; and
(d) allowing the at least one water-soluble salt to react with the carrier-coloring agent composite to form a water-insoluble salt on the surface of the colored speckle.

20. The method of claim 19, wherein the coloring agent is a polymeric colorant.

* * * * *